United States Patent
Lester

(10) Patent No.: US 6,646,452 B2
(45) Date of Patent: Nov. 11, 2003

(54) SENSING OF SEAT OCCUPANT WEIGHT BY CUSHION DEFORMATION

(75) Inventor: Theodore V. Lester, Schiller Park, IL (US)

(73) Assignee: Motorola, Inc., Schaumburg, IL (US)

( * ) Notice: Subject to any disclaimer, the term of this patent is extended or adjusted under 35 U.S.C. 154(b) by 9 days.

(21) Appl. No.: 10/091,214

(22) Filed: Mar. 4, 2002

(65) Prior Publication Data

US 2003/0164715 A1 Sep. 4, 2003

(51) Int. Cl.[7] ................................................. G01R 27/26
(52) U.S. Cl. ........................ 324/661; 324/668; 324/674; 340/667
(58) Field of Search ................................ 280/735, 734, 280/79.2, 730.1; 340/667, 438, 457.1; 324/661, 658, 667, 668, 674, 681, 686; 73/720, 754, 726, 727

(56) References Cited

U.S. PATENT DOCUMENTS 5,446,391 A * 8/1995 Aoki et al. .................. 324/661
5,624,132 A * 4/1997 Blackburn et al. .......... 280/735

FOREIGN PATENT DOCUMENTS

| EP | 1002690 A1 | 5/2000 |
| WO | 00/38959 | 7/2000 |

* cited by examiner

Primary Examiner—N. Le
Assistant Examiner—Vincent Q. Nguyen
(74) Attorney, Agent, or Firm—S. Kevin Pickens; Kevin D. Wills

(57) ABSTRACT

An apparatus (100) for sensing presence and weight of a vehicle occupant includes a first conductor (120) that is electrically coupled to an oscillating circuit and disposed adjacent a first surface (112) of a compliant pad (110) within the seat of the vehicle. A first conductor (120) generates an oscillating signal at a first intensity. A second conductor (130) is disposed adjacent a second opposing surface (114) of the compliant pad (110) and is capable or receiving the oscillating signal at a second intensity. A detection circuit electrically coupled to the second conductor (130) and capable of receiving the oscillating signal at the second intensity determines the presence and weight of a vehicle occupant based upon the second intensity of the oscillating signal.

9 Claims, 2 Drawing Sheets

SENSING OF SEAT OCCUPANT WEIGHT BY CUSHION DEFORMATION

BACKGROUND OF THE INVENTION

1. Field of the Invention

The present invention relates to vehicle sensors and, more specifically, to a vehicle sensor that determines the presence and weight of a seat occupant.

2. Description of the Prior Art

The performance of an automotive air bag system, in terms of its success or failure in preventing serious personal injury, may depend upon the size of the passenger present in the vehicle. For example, if the passenger is of relatively small size such as a child, the passenger may be seriously injured by the deployment of the air bag at full force. In another example a passenger may not be present in the passenger side seat of a vehicle and in the event of an accident, a deployment of the airbag results in an unnecessary cost of repair. Therefore, it is desirable to measure the weight in the seat of an automobile to determine whether, in a crash, to deploy the airbag at full force, partial force, or simply not at all.

Various hardware configurations have been employed to measure the weight of a vehicle passenger. One existing solution uses a number of load sensors distributed beneath the seating surface of the vehicle seat. The load sensors measure the compressive load generated by the weight of the seat occupant. One deficiency of this approach is that each load sensor can only measure the compressive load at one localized point on the seat surface. Since the position of an occupant upon the seat may vary with the size and physical attributes of the individual, several load sensors would be required about the base of the seat and, in some cases, also in the seat back rest. An electronic processing unit is required to interpret the multiple sensor data and make an estimation of passenger size. Such systems are cost prohibitive due to the high initial cost of the multiple load sensors and the electronics required. In operation, the multiple sensors systems are difficult to calibrate and the accuracy of the system over time is suspect.

Another solution uses a load cell at each of the four mounting points of the seat. The measurements from the four sensors are combined to find vehicle occupant weight. This system suffers from the difficulty of precisely matching the mounting planes of the seat and its base. Any mismatch in the seat mounting planes results in an error in the total weight measurement of the vehicle occupant. Additionally, the system cost is high due to the need for multiple load cells of high precision, wiring and connectors for each load cell, and multiple sensing amplifiers.

Therefore, it would be advantageous to provide a system that allows for the cost effective measurement of the weight of an automotive seat occupant. Such a system should provide for the accurate measurement of an occupants weight over the operating life of the vehicle. It is to the provision of such an improved system that the present invention is primarily directed.

DETAILED DESCRIPTION OF THE INVENTION

An illustrative embodiment of the invention is now described in detail. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
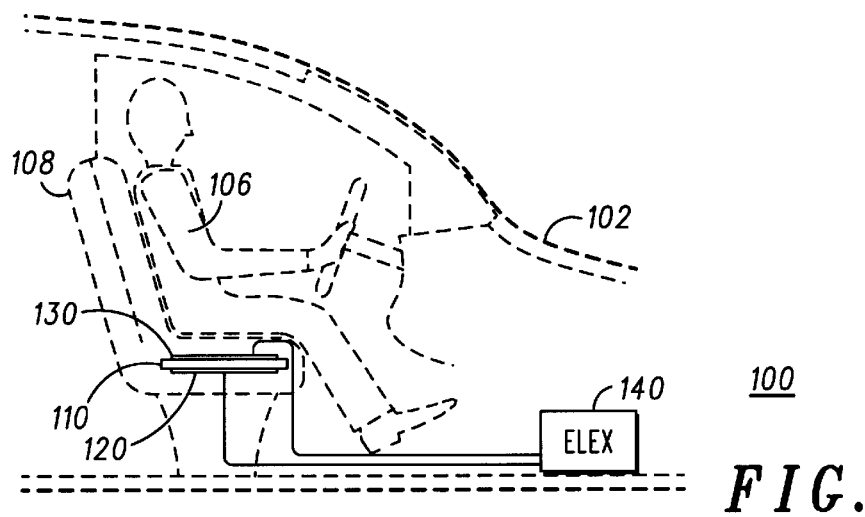
FIG. 1 is a conceptual diagram showing one embodiment of the present invention.

As shown in FIG. 1, one embodiment of the invention is an apparatus 100 for sensing the presence and weight of a vehicle occupant 106 in a vehicle 102 that includes a a seat 108 upon which the occupant 106 sits. An electronics unit 140 controls the apparatus 100 and includes an oscillating circuit that generates an oscillating signal having a first intensity. A compliant pad 110 is disposed within the seat 108. The compliant pad 110 made be made of latex foam approximately one inch thick and is located so as to be compressed by the occupant 106 seated upon the seat 108. The compliant pad 110 may also be made of other cushioning materials as is known in the art.

Figure 2:
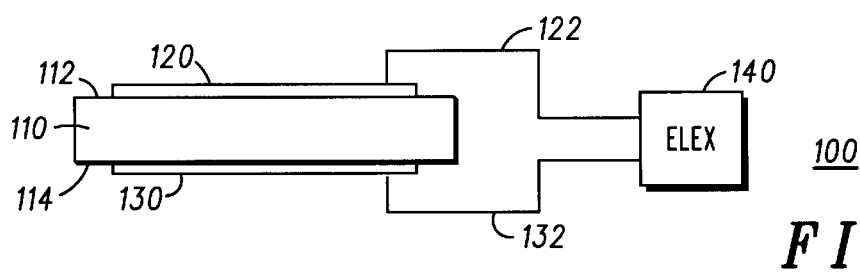
FIG. 2 is a side view of the invention showing the compressible pad and conductors.

As shown in FIG. 2, a first conductor 120 is electrically coupled to the oscillating circuit and disposed adjacent to a first surface 112 of the compliant pad 110. The first conductor 120 is connected to the electronics unit 140 by wire 122. The first conductor 120 is capable of transmitting the oscillating signal at the first intensity. A second conductor 130 is disposed adjacent a second surface 114 spaced apart from the first surface 112 of the compliant pad 110. The second conductor 130 is capable of receiving the oscillating signal at a second intensity. As further shown in FIG. 3, the distance between the first conductor 120 and second conductor 130 varies as the compliant pad 110 is compressed by the weight of the vehicle occupant 106, which is represented by arrow W.

Figure 3:
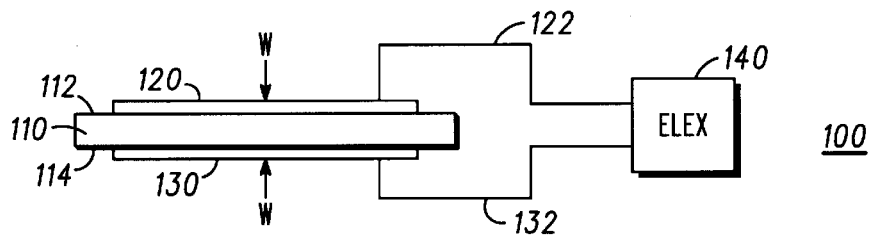
FIG. 3 is side view of one embodiment of the invention, in which the compliant pad is compressed.

As also shown in FIGS. 1–3, the electronic unit 140 includes a detection circuit electrically coupled to the second conductor 130 which is capable of receiving the oscillating signal at the second intensity. The second conductor 130 is connected to the electronics unit 140 by wire 132. As the compliant pad 110 is compressed by the weight of the vehicle occupant 106, the second intensity of the oscillating signal varies in relation to the distance between the first conductor 120 and the second conductor 130. When a vehicle occupant 106 is present in the seat, the first conductor 120 is forced closer to the second conductor 130 by the compression of the compliant pad 110. The capacitive coupling between the two conductors 120, 130 is increased as the conductors are squeezed closer together. As conductors 120 and 130 are moved closer together the second intensity of the oscillating signal increases due to the increase in the capacitive coupling between the conductors.

Figure 4:
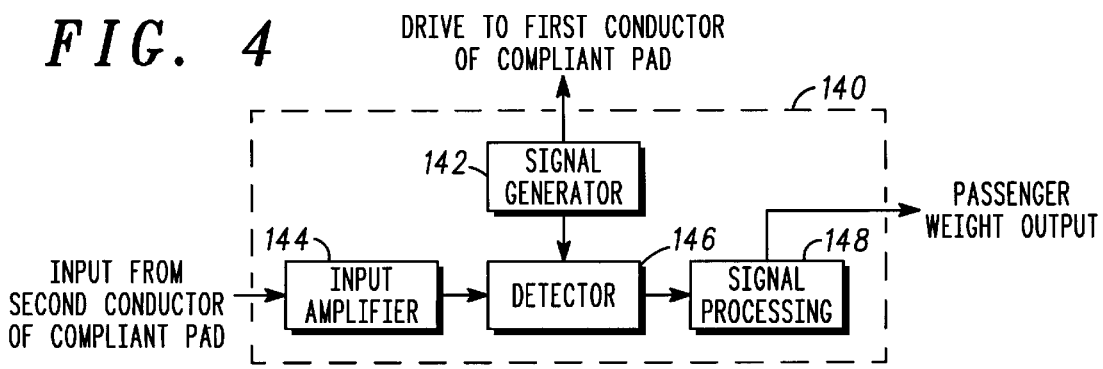
FIG. 4 is a block diagram of a detection circuit employed in one embodiment of the invention.

As shown in FIG. 4, the electronics unit 140 includes a signal generator module 142, input amplifier module 144, detector module 146 and signal processing module 148. The signal generator module 142 generates an oscillating signal having a first intensity. The oscillating signal is applied to the first conductor 120 by wire 122 (as shown in FIGS. 2 and 3). The signal generator module 142 may be a sine wave generator, however many types of signal wave shape may be used. The input amplifier module 144 receives the oscillating signal at a second intensity from the second conductor 130 via wire 132. The input amplifier module 144 amplifies the received signal and passes it to detector module 146. The signal generator module 142 passes the oscillating signal at the first intensity to detector module 146. The detector module 146 compares the oscillating signal intensity received from the signal generator module 142 and the oscillating signal intensity received from the input amplifier module 144. The detector module 146 may be a synchronous detector. The signal processing module 148 receives the detection signal output of the detector module 146 and generates a signal proportionate to the weight of the vehicle occupant 106 by comparing the detection signal output of the detector module 146 to a known value. The electronics unit 140 is thus capable of determining the presence and weight of a vehicle occupant 106. The mechanical properties and thickness of the compliant pad 110, and the first intensity of the oscillating signal may be chosen to optimize the sensitivity of the apparatus 100 to be sensitive in the range of typical vehicle occupant 106 weights.

In one embodiment of the invention, the compliant pad 110 comprises a material having dielectric properties that vary with the compression of the compliant pad 110. In this embodiment, the second intensity varies as the compliant pad 110 is compressed in relation to both a change in the dielectric properties of the material, and the change in the distance between the first conductor 120 and the second conductor 130. The compliant pad 110 could include latex foam as the dielectric cushioning material, or other materials as is known in the art. The latex foam material includes flexible latex solids and air trapped within the pockets or voids of the latex solids. The dielectric properties of the compliant pad 110 cross-section reflect both the dielectric properties of the flexible latex solids and the air entrapped within the latex solids. In the uncompressed state, the capacitance between the first conductor 120 and second conductor 130 is a function of the spacing between the conductors, and the dielectric properties of the uncompressed latex foam material. As the compliant pad 110 is compressed, the latex solids and the air contained within the pockets of the latex solids are squeezed together into a smaller volume changing the dielectric properties of the compliant pad cross-section. The capacitance between the conductors 120 and 130 increases as the compliant pad 110 is compressed due to both the decreased distance between the conductors and the change in dielectric properties of the compliant pad cross-section.

As shown in FIGS. 1 and 2, to aid in the incorporation of the device within the vehicle seat 108, the first conductor 120 is bonded to the first surface 112 of the compliant pad. The second conductor 130 is bonded to the second surface 114 of the compliant pad 110. During vehicle 102 assembly, the wires 122 and 132 are routed through the vehicle seat 108 and interior compartment to the electronics unit 140. In an alternative embodiment, the first conductor 120 could be encased within the compliant pad 110, or the second conductor 130 could be encased within the compliant pad 110, or both conductors 120 and 130 may be encased within the compliant pad 110.

The first conductor 120 and second conductor 130 may include a conductive metal foil. Typically, as a vehicle occupant 106 is seated, the first surface 112 and second surface 114 of the compliant pad 110 do not remain planar. The compliant pad 110 deflects according to the shape of the vehicle occupant 106 or object which is generating the load W. The conductive metal foil is flexible and conforms to the deflected shape of the compliant pad 110 as the load W is applied. In operation, the distance between the first conductor 120 and second conductor 130 will vary across the compliant pad 110 as each conductor is deflected into a 3-dimensional shape by the load W. The total capacitance between the two conductors 120, 130, as measured by the variation in the second intensity, will be a substantially accurate measurement of the total load W regardless of the shape of the vehicle occupant 106 or object applying the load.

In another embodiment of the invention, the first conductor 120 and second conductor 130 could include a conductive coating deposited upon surfaces 112 and 114 respectively of the compliant pad 110. The conductive coating may be flexible and conform to the deflected shape of compliant pad 110.

Figure 5:
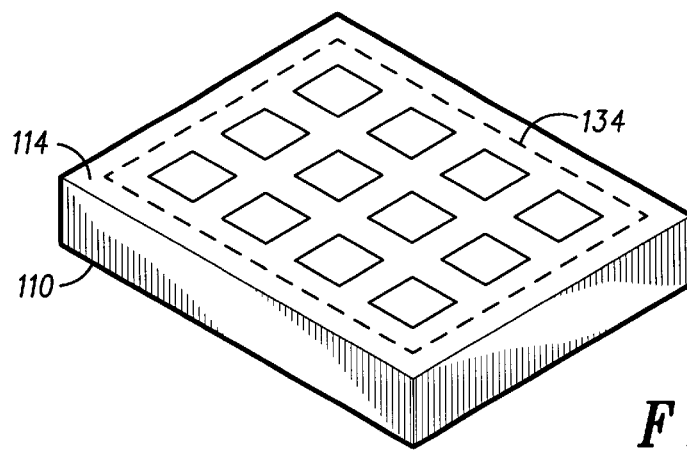
FIG. 5 is a perspective view of one embodiment of the invention showing multiple conductors on the surface of the compressible pad.

As shown in FIG. 5, in another embodiment of the invention the second conductor 130 includes a plurality of second conductors 134 distributed adjacent the second surface 114 of the compliant pad 110 with a plurality of individual second intensities measured at each conductor location. The plurality of individual second intensities measured at the plurality of second conductors 134 are used to characterize an object upon the seat. As shown in FIG. 1, the object may be a vehicle occupant 106 or may merely be a package placed upon the seat. As shown in FIG. 4, the electronics unit 140 receives the plurality of individual second intensities at a plurality of input amplifiers 144. The detector module 146 then produces an output value for each of the individual second intensities. The signal processing module 148 then uses an algorithm to determine if the plurality of detector module 146 output values represent the weight of a vehicle occupant 106 or an inanimate object. The signal processing module 148 then generates a signal indicating, in the event of a crash, whether to deploy the airbag and at what force.

Figure 6:
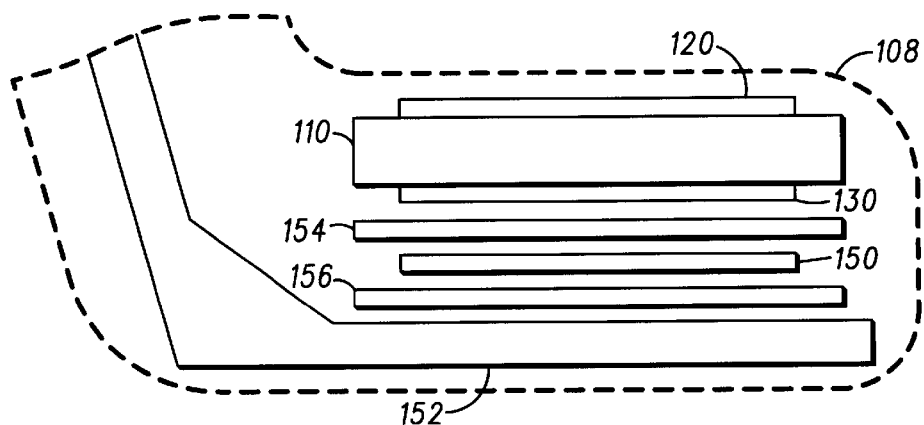
FIG. 6 is a side view of one embodiment of the invention in which a guard conductor is used.

As shown in FIG. 6, in one embodiment of the invention, to reduce capacitive loading from the seat 108 a guard conductor 150 is disposed between the second conductor 130 and the structure of the seat 152. The structure of the seat 152 includes the metal frame of the seat and associated mounting hardware. The guard conductor 150 is made of conductive material and may have a periodic signal, corresponding to the periodic voltage of the oscillating signal, applied to it. The guard conductor 150 may be made of the same conductive material as the conductors 120, 130. An insulating layer 154 is positioned between the second conductor 130 and the guard conductor 150 to ensure the two conductors are precluded from direct electrical contact. A second insulating layer 156 is positioned between the guard conductor 150 and the structure of the seat 152. The insulating layers 154, 156 may be made of Mylar sheet or another suitable insulator as is known in the art.

Figure 7:
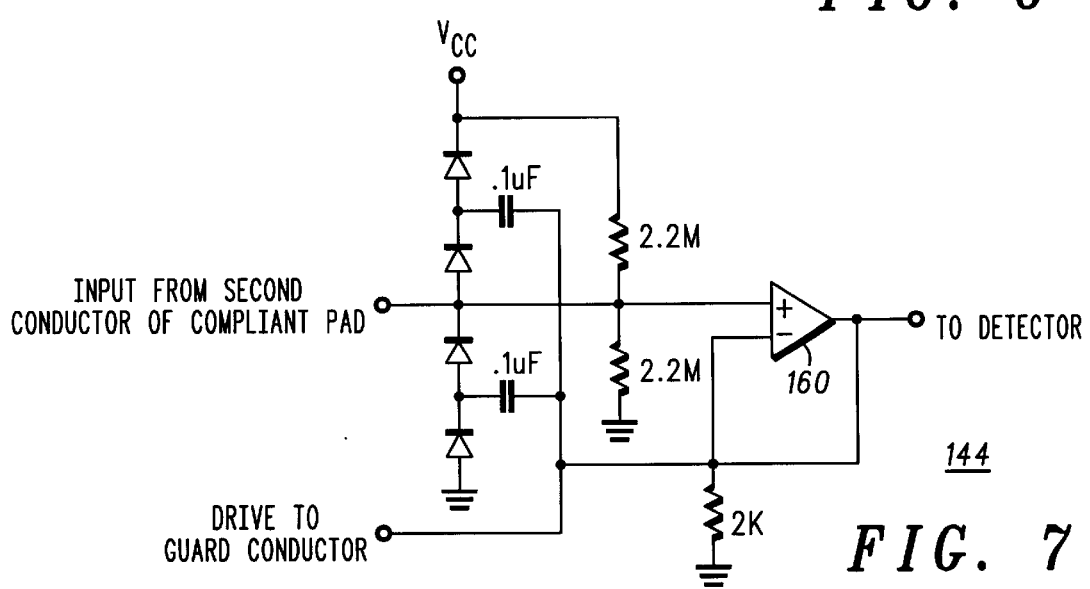
FIG. 7 is a schematic diagram of an amplification circuit employed in one embodiment of the invention.

One embodiment of the input amplifier 144 is shown in FIG. 7. In this embodiment, an amplifier 160 is biased to provide a high impedance input from the second conductor 130. The detection signal output of the amplifier 160 is sent to the detector module 146 and is also used to drive the corresponding guard conductor 150 with a low impedance signal having a frequency, phase, and amplitude corresponding to that of the sensed electrostatic signal.

The high impedance input amplifier 160 is a voltage follower with 100% feedback to the inverting input. This configuration helps maximize input impedance. With this type of amplifier, common practice is to provide a diode clamp to supply and ground. However, in this high impedance application, the capacitance of the diodes would provide an undesirable load to the input signal. By using pairs of diodes for the clamps and driving the cathode-to-anode junctions with the guard drive signal, the diode capacitance effect is eliminated.

A seated vehicle passenger may, upon fastening his seat belt, tighten the seat belt to a point where the vehicle occupant weight as determined by the apparatus 100 would be consistent with a heavier passenger: The problem may be avoided by using the "seat belt fastened" signal, as it is commonly known in the art, which is present when the seat belt clasp is engaged to terminate vehicle occupant weight measurement. The vehicle occupant weight that was detected before the seat belt clasp was fastened may be retained, thus avoiding the error introduced by tightening the seat belt.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for sensing the presence and weight of a vehicle occupant, the vehicle including a seat upon which the occupant may sit the seat including a seat frame the apparatus comprising:
   (a) an oscillating circuit that generates an oscillating signal having a first intensity;
   (b) a compliant paid disposed within the seat, the complaint pad located so as to be compressed by an occupant seated upon the seat;
   (c) a first conductor, electrically coupled to the oscillating circuit and disposed adjacent a first surface of the compliant pad, the first conductor capable of transmitting the oscillating signal at the first intensity, and wherein the first conductor is bonded to the first surface of the compliant pad;
   (d) a second conductor, disposed adjacent a second surface spaced apart from the first surface of the compliant pad, that is capable of receiving the oscillating signal at a second intensity, the distance between the first conductor and the second conductor varying as the compliant pad is compressed; and
   (e) a defection circuit electrically coupled to the second conductor that is capable of receiving the oscillating signal at the second intensity, the second intensity varying in relation to the distance between the first conductor and the second conductor, the detention circuit capable of determining the presence and weight of a vehicle occupant based upon the variation in the second intensity.

2. An apparatus for sensing the presence and weight of a vehicle occupant, the vehicle including a seat upon which the occupant may sit, the seat including a seat frame, the apparatus comprising:
   (a) an oscillating circuit that generates an oscillating signal having a first intensity;
   (b) a compliant pad disposed within the seat, the compliant pad located so as to be compressed by an occupant seated upon the seat;
   (c) a first conductor, electrically coupled to the oscillating circuit and disposed adjacent a first surface of the compliant pad, the first conductor capable of transmitting the oscillating signal at the first intensity;
   (d) a second conductor, disposed adjacent a second surface spaced apart from the first surface of the compliant pad, that is capable of receiving the oscillating signal at a second intensity, the distance between the first conductor and the second conductor varying as the compliant pad is compressed, and wherein the second conductor is bonded to the second surface of the compliant pad; and
   (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

3. An apparatus for sensing the presence and weight of a vehicle occupant, the vehicle including a seat upon which the occupant may sit, the seat including a seat frame, the apparatus comprising:
   (a) an oscillating circuit that generates an oscillating signal having a first intensity;
   (b) a compliant pad disposed within the seat, the compliant pad located so as to be compressed by an occupant seated upon the seat;
   (c) a first conductor, electrically coupled to the oscillating circuit and disposed adjacent a first surface of the compliant pad, the first conductor capable of transmitting the oscillating signal at the first intensity, and wherein the first conductor is encased within the compliant pad;
   (d) a second conductor, disposed adjacent a second surface spaced apart from the first surface of the compliant pad, that is capable of receiving the oscillating signal at a second intensity, the distance between the first conductor and the second conductor varying as the compliant pad is compressed; and
   (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

4. An apparatus for sensing the presence and weight of a vehicle occupant, the vehicle including a seat upon which the occupant may sit, the seat including a seat frame, the apparatus comprising:
   (a) an oscillating circuit that generates an oscillating signal having a first intensity;
   (b) a compliant pad disposed within the seat, the compliant pad located so as to be compressed by an occupant seated upon the seat;
   (c) a first conductor, electrically coupled to the oscillating circuit and disposed adjacent a first surface of the compliant pad, the first conductor capable of transmitting the oscillating signal at the first intensity;
   (d) a second conductors, disposed adjacent a second surface spaced apart from the first surface of the compliant pad, that is capable of receiving the oscillating signal at a second intensity, the distance between the first conductor and the second conductor varying as the compliant pad is compressed, and wherein the second conductor is encased within the, compliant pad; and (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

5. An apparatus for sensing the weight of a vehicle occupant, the vehicle including a seat upon which the occupant may sit, the seat including a seat frame, the apparatus comprising:

(a) an oscillating circuit that generates an oscillating signal having a first intensity;

(b) a compliant pad disposed within the seat, the compliant pad located so as to be compressed by an occupant seated upon the seat;

(c) a first conductor, electrically coupled to the oscillating circuit and disposed adjacent a first surface of the compliant pad, the first conductor capable of transmitting the oscillating signal at the first intensity, and wherein the first conductor comprises a conductive coating deposited upon the first surface of the compliant pad;

(d) a second conductor, disposed adjacent a second surface spaced apart from the first surface of the compliant pad, that is capable of receiving the oscillating signal at a second intensity, the distance between the first conductor and second conductor varying as the compliant pad is compressed; and (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

6. An apparatus for sensing the presence and weight of a vehicle occupant, the vehicle including a seat upon which the occupant may sit, the seat including a seat frame, the apparatus comprising:

(a) an oscillating circuit that generates an oscillating signal having a first intensity;

(b) a compliant pad disposed within the seat, the compliant pad located so as to be compressed by an occupant seated upon the seat;

(c) a first conductor, electrically coupled to the oscillating circuit and disposed adjacent a first surface of the compliant pad, the first conductor capable of transmitting the oscillating signal at the first intensity;

(d) a second conductor, disposed adjacent a second surface spaced apart from the first surface of the compliant pad, that is capable of receiving the oscillating signal at a second intensity, the distance between the first conductor and the second conductor varying as the compliant pad is compressed, and wherein the second conductor comprises a conductive coating deposited upon the second surface of the compliant pad; and (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

7. An apparatus for sensing the presence and weight of a vehicle occupant, the vehicle including a seat upon which the occupant may sit, the seat including a seat frame, the apparatus comprising:

(a) an oscillating circuit that generates an oscillating signal having a first intensity;

(b) a compliant pad disposed within the seat, the compliant pad located so as to be compressed by an occupant seated upon the seat;

(c) a first conductor electrically coupled to the oscillating circuit and disposed adjacent a first surface of the compliant pad, the first conductor capable of transmitting the oscillating signal at the first intensity;

(d) a second conductor, disposed adjacent a second surface spaced apart from the first surface of the compliant pad, that is capable of receiving the oscillating signal at a second intensity, the distance between the first conductor and the second conductor varying as the compliant pad is compressed, and wherein the second conductor comprises a plurality of second conductors distributed adjacent to the second surface of the compliant pad with a plurality of individual second intensities measured at each conductor location; and (e) a detection circuit electrically coupled to the second conductor that is capable of receiving the oscillating signal at the second intensity, the second intensity varying in relation to the distance between the first conductor and the second conductor, the detection circuit capable of determining the presence and weight of a vehicle occupant based upon the variation in the second intensity.

8. The apparatus of claim 7, wherein the plurality of individual second intensities measured at the plurality of second conductors are used to characterize an object upon the seat.

9. An apparatus for sensing the presence and weight of a vehicle occupant, the vehicle including a seat upon which the occupant may sit, the seat including a seat frame, the apparatus comprising:

(a) an oscillating circuit that generates an oscillating signal having a first intensity;

(b) a compliant pad disposed within the seat, the compliant pad located so as to be compressed by an occupant seated upon the seat;

(c) a first conductor, electrically coupled to the oscillating circuit and disposed adjacent a first surface of the compliant pad, the first conductor capable of transmitting the oscillating signal at the first intensity;

(d) a second conductor, disposed adjacent a second surface spaced apart from the first surface of the compliant pad, that is capable of receiving the oscillating signal at a second intensity, the distance between the first conductor and the second conductor varying as the compliant pad is compressed; and (e) a detection circuit electrically coupled to the second conductor that is capable of receiving the oscillating signal at the second intensity, the second intensity varying in relation to the distance between the first conductor and the second conductor, the detention circuit capable of determining the presence and weight of a vehicle occupant based upon the variation the second intensity;

(f) a guard conductor disposed between the second conductor and the seat frame, wherein each guard conductor shields the second conductor from the seat frame, wherein the detection circuit comprises a high impedance amplifier having a first input and a second input, the first input of each amplifier electrically coupled to the second conductor so as to be capable of receiving the oscillating signal at the second intensity, the amplifier capable of generating an amplified signal that has a value that is proportional to the second intensity, the amplified signal being fed back to the second input and being electrically coupled to the guard conductor so as to generate a low impedance source signal sufficient to reduce capacitive loading from the seat frame.

* * * * *